United States Patent [19]
Lehtimäki

[11] Patent Number: 5,991,716
[45] Date of Patent: Nov. 23, 1999

[54] TRANSCODER WITH PREVENTION OF TANDEM CODING OF SPEECH

[75] Inventor: Matti Lehtimäki, Espoo, Finland

[73] Assignee: Nokia Telecommunication OY, Espoo, Finland

[21] Appl. No.: 08/930,988

[22] PCT Filed: Apr. 11, 1996

[86] PCT No.: PCT/FI96/00192

§ 371 Date: Oct. 14, 1997

§ 102(e) Date: Oct. 14, 1997

[87] PCT Pub. No.: WO96/32823

PCT Pub. Date: Oct. 17, 1996

[30] Foreign Application Priority Data

Apr. 13, 1995 [FI] Finland ................................. 951807

[51] Int. Cl.$^6$ .............................. G10L 3/00; H04Q 7/30
[52] U.S. Cl. ..................... 704/212; 704/214; 704/219
[58] Field of Search ................... 704/214, 219, 704/212; 370/79; 455/33.1, 116

[56] References Cited

U.S. PATENT DOCUMENTS

| | | | |
|---|---|---|---|
| 5,430,724 | 7/1995 | Fall et al. ................................. | 370/79 |
| 5,491,719 | 2/1996 | Sellin et al. ............................. | 375/213 |
| 5,692,105 | 11/1997 | Leppanen et al. ..................... | 395/2.94 |

FOREIGN PATENT DOCUMENTS

| | | |
|---|---|---|
| 332 345 | 9/1989 | European Pat. Off. . |
| 95/22817 | 8/1995 | WIPO . |
| 95/24789 | 9/1995 | WIPO . |

OTHER PUBLICATIONS

J.P. Campbell, Jr. et al., The DOD 4.8 KBPS Standard (proposed Federal Standard 1016), Advances in speech coding, Kluwer Academic Publishers, 1991, p. 133, see p. 125, Table 1 and 132.

GSM Recommendation 08–60, "Inbad Control of Remote Transcoder and Rate Adaptors", ETSI/TC, Feb. 1992, cited in the application see p. 4–26.

"European digital cellular telecommunications system (Phase 2); full rate speech transcoding (GSM 06.10)", European Telecommunication Standard, Sep. 1994, ETS 300 580–2, GMS 06.10, ETSI TC–SMG, ICS: 33.060.30, pp. 2–70.

"Comfort Nosie Aspects For Full Rate Speech Traffic Channels", Jan. 12, 1989, CEPT/CCH/GSM, GSM Recommendation: 06.12, Version 3.0.0, pp. 1–5.

"European digital cellular telecommunications system; Half rate speech Part 3: Substitution and muting of lost frames for half rate speech traffic channels (GSM 06.21):", European Telecommunication Standard, Nov. 1995, ETS 300 581–3, ETSI TC–SMG, Reference: DE/SMG–020621, ICS: 33.060.50, pp. 2–11.

(List continued on next page.)

*Primary Examiner*—Susan Wieland
*Attorney, Agent, or Firm*—IP Group Pillsbury Madison & Sutro LLP

[57] ABSTRACT

A transcoder which prevents tandem coding of speech in a mobile-to-mobile call within a mobile communication system uses a speech coding method for reducing transmission rate on the radio path. The transcoder includes a speech coder, which encodes the speech signal into speech parameters for transmission to a mobile station, and decodes the speech parameters received from the mobile station into a speech signal according to the speech coding method, as well as a PCM coder for transmitting an uplink speech signal to and for receiving a downlink speech signal from a PCM interface in the form of PCM speech samples. In addition to the normal operation, the transcoder transmits and receives speech parameters through a PCM interface in a subchannel formed by least significant bits of the PCM speech samples. Thus, it is possible to prevent tandem coding while maintaining the standard PCM interface, and the signaling and services associated thereto.

35 Claims, 5 Drawing Sheets

OTHER PUBLICATIONS

"European digital cellular telecommunications system; Half rate speech Part 4: Comfort noise aspects for the half rate speech traffic channels (GSM 06.22)" European Telecommunication Standard, Nov. 1995, ETS 300 581–4, Source: ETSI TC–SMG, Reference: DE/SMG–020622, ICS: 33.060.50, pp. 2–15.

"Discontinuous Transmission (DTX) For Full Rate Speech Traffic Channels", Jan. 12, 1989, CEPT/CCH/GSM, GSM 06.31, pp. 1120–1124.

Digital cellular telecommunications system; Vocie Activity Detection (VAD) (GSM 06.32), European Telecommunication Standard, Oct. 1996, ETS 300 580–6, 3rd Edition, Source: ETSI TC–SMG, Reference: RE/SMG–020632PR2, ICS: 33.060.50, pp. 2–40.

European digital cellular telecommunications system; Half rate speech Part 5: Discontinuous transmission (DTX) for half rate speech traffic channels (GSM 06.41), European Telecommunication Standard, Nov. 1995, ETS 300 581–5, Source: ETSI TC–SMG, Reference: DE/SMG–020641, ICS: 33.060.50, pp. 2–16.

"European digital cellular telecommunications system (Phase 2); In–band control of remote transcoders and rate adaptors for half rate traffic channels (GSM 08.61)", European Telecommunication Standard, Aug. 1995, prETS 300 598, Source: ETSI TC–SMG, Reference: DE/SMG–030861P, ICS: 33.060.50, pp. 2–39.

"European digital cellular telecommunications system (Phase 2); Substitution and muting of lost frmaes for rate speech channels (GSM 06.11)", European Telecommunication Standard, Sep. 1994, ETS 300 580–3, Source: ETSI TC–SMG, Reference: GSM 06.11, UDC: 621.396.21, Version 4.0.4.

Mouly et al., "The GSM System for Mobile Communications", 1992, pp. 216, 232–259.

International Telecommunication Union, Telecommunication Standardization Sector of ITU, General Aspects of Digital Transmission Systems, Pulse Code Modulation (PCM) of Voice Frequencies, ITU–T Recommendation G.711.

International Telecommunication Union, The International Telegraph and Telephone Consultative Committee, General Aspects of Digital Transmission Systems; Transmission Performance Characteristics of Pulse Code Modulation, Recommendation G.712.

| OCTET NUMBER | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | | | | | | | |
| 5 | | | | | | | | |
| 6 | 1 | | | | | | | |
| 7 | | | | | | | | |
| 8 | 1 | | | | | | | |
| 9 | | | | | | | | |
| 10 | 1 | | | | | | | |
| 11 | | | | | | | | |
| 12 | 1 | | | | | | | |
| 13 | | | | | | | | |
| 14 | 1 | | | | | | | |
| 15 | | | | | | | | |
| 16 | 1 | | | | | | | |
| 17 | | | | | | | | |
| 18 | 1 | | | | | | | |
| 19 | | | | | | | | |
| 20 | 1 | | | | | | | |
| 21 | | | | | | | | |
| 22 | 1 | | | | | | | |
| 23 | | | | | | | | |
| 24 | 1 | | | | | | | |
| 25 | | | | | | | | |
| 26 | 1 | | | | | | | |
| 27 | | | | | | | | |
| 28 | 1 | | | | | | | |
| 29 | | | | | | | | |
| 30 | 1 | | | | | | | |
| 31 | | | | | | | | |
| 32 | 1 | | | | | | | |
| 33 | | | | | | | | |
| 34 | 1 | | | | | | | |
| 35 | | | | | | | | |
| 36 | 1 | | | | | | | |
| 37 | | | | | | | | C16 | C17 |
| 38 | 1 | | | | | | | T3 | T4 |
| 39 | C18 | C19 | C20 | C21 | T1 | T2 | | |

FIG. 2

TRANSCODER WITH PREVENTION OF TANDEM CODING OF SPEECH

FIELD OF THE INVENTION

The present invention relates to a transcoder comprising means for preventing tandem coding of speech in a mobile to mobile call within a mobile communication system which employs a speech coding method reducing transmission rate on the radio path, a speech coder for encoding the speech signal to be transmitted to a mobile station into speech parameters, and decoding the speech parameters received from the mobile station into a speech signal according to said speech coding method, and a PCM coder for transmitting an uplink speech signal to and for receiving a downlink speech signal from a PCM interface in the form of PCM speech samples.

BACKGROUND OF THE INVENTION

In recent years, digital mobile communication systems for fully digital speech and data transmission have been introduced. As far as the mobile communication network is concerned, the most limited resource is the radio path between the mobile stations and the base stations. To reduce the bandwidth requirements of a radio connection on the radio path, speech transmission utilizes speech encoding providing a lower transmission rate, for example 16 or 8 kbit/s instead of the 64 kbit/s, transmission rate typically used in telephone networks. For speech encoding, both the mobile station and the fixed network end must have a speech encoder and a speech decoder. On the network side, the speech coding functions may be located in several alternative places, for example at the base station or in the mobile services switching center. The speech encoder and decoder are often located remote from the base station in so-called remote transcoder units. In the latter case, speech encoding parameters are sent between the base station and the transcoder unit in specific frames.

In each mobile originating or mobile terminating speech call, a transcoder is connected to the speech connection on the network side. The transcoder decodes the mobile originating speech signal (uplink direction), and encodes the mobile terminating speech signal (downlink direction). This type of an arrangement causes no-problems as long as only one of the speech participants is a mobile station and the other, for example, a subscriber of a public switched telephone network (PSTN).

If the call takes place between two mobile stations (Mobile to Mobile Call, MMC), the operation of the mobile communication network involves a transcoder on the connection between the calling mobile station and the mobile services switching center, and, correspondingly, a second transcoder between the called mobile subscriber and the (same or another) mobile services switching center. These transcoders are then inter-connected by the mobile services switching center (centers) as a result of normal call switching. In other words, for each MMC call there are two transcoder units in a series connection, and speech encoding and decoding are performed twice for the call. This is known as tandem coding. Tandem coding presents a problem in mobile communication networks as it degrades the speech quality due to the extra speech encoding and decoding. So far, tandem coding has not been a major problem because relatively few calls are MMC calls. However, as the number of mobile stations increases, the number of MMC calls will also be higher and higher.

DISCLOSURE OF THE INVENTION

It is an object of the present invention to prevent tandem coding and consequently to improve speech quality in mobile to mobile calls.

This object is achieved by a transcoder which, according to the invention, is characterized by the transcoder comprising means for transmitting and receiving said speech parameters in a subchannel formed by one or more least significant bits of said PCM speech samples simultaneously with said PCM speech samples.

The invention also relates to a method for preventing tandem coding of speech in a mobile to mobile call, which method comprises the steps of: encoding a speech signal by a speech coding method which reduces transmission rate and provides speech parameters, transmitting the speech parameters over the radio interface to a first transcoder in the mobile communication network, decoding the speech parameters by said speech coding method so as to restore said speech signal, transmitting said speech signal from the first transcoder to a second transcoder as PCM speech samples. The method of the invention is further characterized by transmitting said speech parameters, received over the radio interface, from the first transcoder to the second transcoder simultaneously with said PCM speech samples in a subchannel formed by one or more least significant bits of said PCM speech samples.

The invention further relates to an arrangement for preventing tandem coding of speech in a mobile communication system in which the mobile stations and the mobile communication network comprise speech coders for transmitting a speech signal over the radio path in the form of speech coding parameters at a speech coding rate, and in which a mobile to mobile call comprises in the mobile communication network a tandem connection of two speech coders, there being a normal PCM interface between the speech coders in said tandem connection, characterized by a subchannel formed by one or more least significant bits of PCM speech samples in the PCM interface for forwarding the speech coding parameters provided by the speech coder in the mobile station through the mobile communication network without decoding or encoding being carried out in the speech coders of the mobile communication network.

In the preferred embodiment of the present invention, an MMC call can be established according to the normal procedures of the mobile communication network so that the connection has two transcoders in a tandem configuration. The speech transferred between a transcoder and a mobile station is coded by a speech coding method which reduces the transmission rate. Both the transcoders carry out the normal transcoding operations for the speech by decoding it in one transcoder into normal digital pulse code modulated (PCM) speech samples which are forwarded to the second transcoder and encoded therein by said speech coding method. In the subchannel formed by one or two of the least significant bits of the PCM speech samples, there is simultaneously transferred speech information which is in accordance with said speech coding method and received from the mobile station, i.e. speech parameters for which no transcoding operations (encoding and decoding) are carried out in either of the tandem connected transcoders. The receiving transcoder primarily chooses the speech information that is in accordance with this speech encoding method to be transmitted over the radio interface to the receiving mobile station. Consequently, speech coding is carried out primarily in the mobile stations only, and the coded speech information, i.e. speech parameters, are passed through the mobile communication network without tandem coding, which improves speech quality. When the receiving transcoder cannot find the coded speech information in the least significant bits of the PCM speech samples, the speech information to be transmitted over the radio interface is encoded in the normal manner from the PCM speech samples. The use of one or two least significant bits of the PCM speech samples as a subchannel according to the invention only marginally deteriorates the speech quality of the PCM connection, and the effect is even alleviated by the inevitable deterioration of speech quality due to the speech coding at low bit rate.

The solution in which the only aim is to evade tandem coding requires signalling outside the traffic channel, which, apart from the modifications in various network elements, also causes many other problems as a result of e.g. various kinds of supplementary services. Such supplementary services include call transfer, call hold in which, for example, music can be provided by the mobile services switching center to the calling party, services for a multitude of subscribers (conference calls), etc. For example, announcements or music from the center would not reach the subscribers if only speech encoding information were transferred between the transcoders. As there exists a normal PCM interface between the tandem connected transcoders of the invention, it is possible to maintain all the standard signalling associated with in this interface as well as the supplementary services, and to avoid the problems disclosed above. In the implementation of the invention, only the transcoder need be modified. The modifications do not have to be standardized either, but they can be implemented manufacturer specifically without any compatibility problems being created. The invention can be applied to all MMC calls regardless of whether the mobile stations are within the service area of the same mobile services switching center or not. The only prerequisite is a digital end-to-end connection between the transcoders; however, the lack of such a connection does not create any additional problems, but merely breaks the "subchannel" according to the invention, which corresponds with a situation of a normal tandem coded call.

In the mobile communication system, a transcoder may be located in several alternative locations, for example at the base station or separate from the base station. In the latter case, the transcoder is referred to as a remote transcoder, and speech encoding information is in the mobile communication network transferred between the base station and the remote transcoder in specific frames, which also contain synchronization and control information. By doing so, tandem coding can be avoided in the MMC calls by forwarding, with minor modifications, the frames received from a base station to another base station through a "subchannel" between two tandem connected transcoders without the transcoders carrying out any speech encoding or decoding. The receiving transcoder continuously searches for synchronization in the one or two least significant bits of the PCM speech samples, and simultaneously encodes PCM samples. If synchronization is found, the receiving transcoder transfers the frames received from the subchannel to the base station. If there exists no synchronization, or it is lost, the receiving transcoder transmits speech encoding information which is encoded from normal PCM samples and packed into frames to the base station. Thus, the transcoders need not know that the call is an MMC call, and that a tandem prevention mode is required. Such information may, however, be given to the transcoder by providing the frames sent from the base stations to the transcoders (uplink frames) with information that the frames are associated with an MMC call. Thus, the decision on the handling of each frame is based on the information in the particular frame. Furthermore, the frame handling may vary according to control information contained in them. As examples of special handling, bad frame handling and discontinuous transmission (DTX) are mentioned.

If the transcoder is located at the base station, one solution is to convert the speech coding information received from the radio interface into frames which are transferred to a second base station through a "subchannel" of the invention, for example by following the same principle as in the case of remote transcoders.

BRIEF DESCRIPTION OF THE DRAWINGS

In the following, the invention will be described by means of the preferred embodiments with reference to the accompanying drawings, in which FIG. 2 illustrates a TRAU speech frame in accordance with the GSM recommendation 8.60.

PREFERRED EMBODIMENTS OF THE INVENTION

The present invention can be applied to any mobile communication system which utilizes digital speech transmission and speech encoding techniques reducing the transmission rate.

One example is the European digital cellular mobile communication system GSM (Global System for Mobile Communications) which is becoming a world-wide standard for mobile communication systems. The basic elements of the GSM system are described in the GSM Recommendations. For a closer description of the GSM system, the GSM recommendations and "The GSM System for Mobile Communications", by M. Mouly & M. Pautet, Palaiseau, France, 1992, ISBN: 2-9507190-0-7 is referred to.

The GSM and a modification thereof, DCS1800 (Digital Communication System) operating at the 1800 Mhz frequency range, are the primary targets for the invention, but it is not intended that the invention be restricted to these radio systems.

Figure 1:
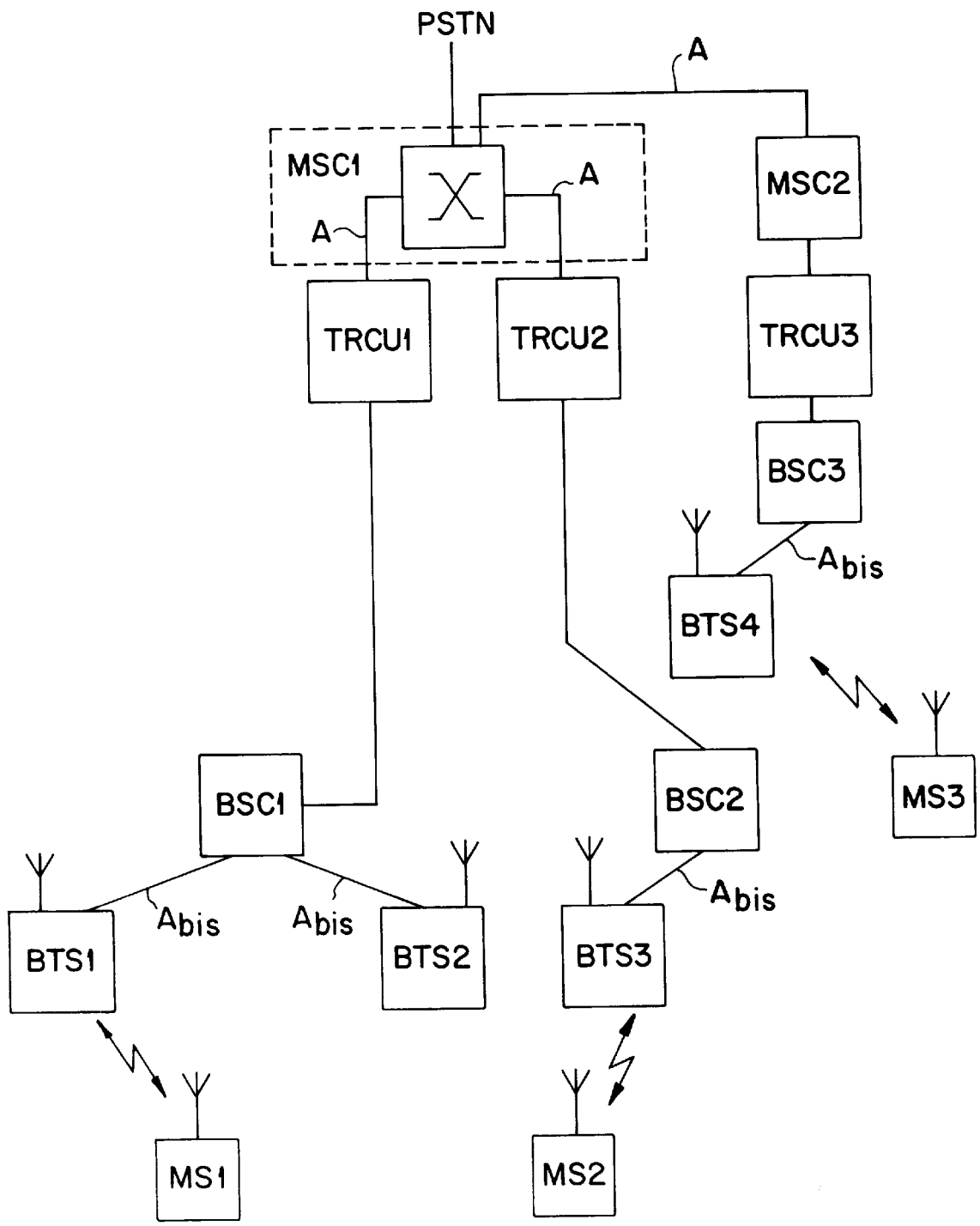
FIG. 1 illustrates a mobile communication system according to the invention.

FIG. 1 very briefly describes the basic elements of the GSM system. A mobile services switching centre MSC handles the connecting of incoming and outgoing calls. It performs functions similar to those of an exchange of a public switched telephone network (PSTN). In addition to these, it also performs functions characteristic of mobile communications only, such as subscriber location management. The mobile stations MS are connected to the center MSC by base station systems. The base station system consists of a base station controller BSC and base stations BTS. One base station controller BSC is used to control several base stations BTS.

The GSM system is entirely digital, and speech and data transmission are also carried out entirely digitally, which results in a uniform quality of speech. In speech transmission, the current speech encoding method in use is the RPE-LTP (Regular Pulse Excitation—Long Term Prediction) which utilizes both short and long term prediction. The coding produces LAR, RPE and LTP parameters which are sent instead of the actual speech. Speech transmission is dealt with in the GSM recommendations in chapter 06, and speech encoding particularly in the recommendation 06.10. In the near future, other coding methods will be employed, such as half rate methods, with which the present invention can be used as such. As the actual invention does not relate to the speech encoding method, and as it is independent of it, any speech coding method will not be described in any further detail herein.

Naturally, the mobile station must have a speech coder and decoder for speech coding. As the implementation of the mobile station is neither essential to the present invention nor unusual, it is not dealt with here in any closer detail.

1. Transcoder and TRAU Frames

On the network side, various functions relating to speech coding and rate adaptation are concentrated in a transcoder unit TRCU (Transcoder/Rate Adaptor Unit). The TRCU may be located in several alternative locations in the system according to choices made by the manufacturer. The interfaces of the transcoder unit include 64 kbit/s PCM (Pulse Code Modulation) interface towards the mobile services switching center MSC (A interface), and a 16 or 8 kbit/s GSM interface towards the base station BTS. Relating to said interfaces, the terms uplink and downlink are also used in the GSM recommendations, the uplink being the direction from the base station BTS to the mobile services switching center MSC, while the downlink is the reverse direction.

In cases the TRCU is placed remote from a base station BTS, information is sent between the base station and the transcoder/rate adaptor unit TRCU in so-called TRAU frames. The TRAU frame includes 320 bits according to the recommendation 08.60 and 160 bits according to the recommendation 08.61. There are presently four different frame types defined according to information content in them. These are speech, operations/maintenance, data, and the so-called idle speech frame.

Typically, the transcoder unit TRCU is located at the mobile services switching center MSC, but it may also be a part of a base station controller BSC or a base station BTS. A transcoder unit placed remote from the base station BTS must receive information on the radio interface for efficient decoding. For such control and synchronization of the transcoder, a special kind of inband signalling is used on the 16 kbit/s channel between the base station and the transcoder unit. This channel is also used for speech and data transmissions. Such remote control of a transcoder unit is described in the GSM recommendation 08.60 and 08.61. In the following, only the system in accordance with the recommendation 08.60 will be dealt with, but the methods described are easily applicable to a system in accordance with the recommendation 08.61 as well.

To carry out synchronization, the first two octets of each frame comprise 16 synchronization bits. In addition, the first bit of the 16-bit words (2 octets) that constitute a frame is a synchronization check bit. In addition to the bits containing the actual speech, data or operation/maintenance information, each frame comprises control bits in which information of the frame type and a varying amount of other frame-type-specific information is conveyed. Furthermore, the last four bits T1–T4 of, for example, speech and idle frames are assigned for the aforementioned time alignment.

FIG. 2 illustrates a TRAU speech frame having 21 control bits C1–C21 and, in addition, the last 4 bits T1–T4 of the frame are assigned for time alignment. The actual speech information bits are in the octets 4–38. In practice, the speech information consists of LAR, RPE and LTP parameters of the RPE-LTP (Regular Pulse—Long Term Prediction) speech encoding method. The idle speech frame is similar to the speech frame illustrated in FIG. 2, except that all the traffic bits of the frame are in logic state "1".

The GSM recommendation 8.60 defines control bits as follows. The bits C1–C4 determine the frame type, i.e. C1C2C3C4=1110=downlink speech frame and C1C2C3C4=0001=uplink speech frame. Bit C5 determines the channel type, i.e. C5=0=full rate channel and C5=1=half rate channel. Bits C6–C11 are control bits for time alignment. Bits C12–C15 are frame indicators for uplink direction, and C16 is the frame indicator for downlink direction, primarily relating to discontinuous transmission. The coding and use of the frame indicators are described in the GSM recommendations 08.60 and 06.31. C12 is a Bad Frame Indicator BFI, which is also used in continuous transmission, i.e. BFI=0=good frame and BFI=1=bad frame. C13–C14 establish the SID code (Silence Descriptor). C15 is a time alignment bit TAF. C17 is a downlink DTX bit indicating whether the discontinuous transmission DTX is in use in the downlink (DTX=1) or not (DTX=0). Bits C18–C21 are spare bits in the uplink direction. C16 is a SP bit indicating in the downlink direction whether said frame comprises speech. In the downlink direction, the other control bits are spare bits.

Along with the recommendation 08.60, a newer GSM recommendation 08.61 now exists, in which several TRAU frame types are also defined, but in which the control bits used differ from the ones of the GSM recommendation 08.60. All the basic solutions relating to the invention of this application can, however, easily be implemented in a mobile communication system according to the GSM recommendation 08.61.

2. Discontinuous Transmission DTX

Discontinuous transmission DTX refers to a method by which a transmission on the radio path may be interrupted for the duration of pauses in speech. The aim is to decrease transmitter power consumption, a prime concern for mobile stations, and general noise level on the radio path, which effects the system capacity. DTX causes certain distinctive features in the tandem prevention operation of the present invention, and thus the following at first examines an ordinary DTX by using the GSM system as an example.

The discontinuous transmission is carried out by means of three major elements. On the transmitting side, a Voice Activity Detection VAD is required, which is used for checking whether a signal under examination contains speech or solely background noise. The VAD function is determined in the GSM recommendation 6.32 and it is basically based on analysis of signal energy and spectral changes. In addition, a function for calculating the background noise parameters is required on the transmitting side. On the basis of the noise parameters obtained from the transmitting side, so-called comfort noise is generated on the receiving side in order not to subject the listener to unpleasant switching between speech with background noise and total silence. All the elements of discontinuous transmission are largely based on a speech codec implementing RPE-LTP coding, and its internal parameters.

2.1 Functions of Transmitting Side (Transcoder downlink DTX)

Figure 3:
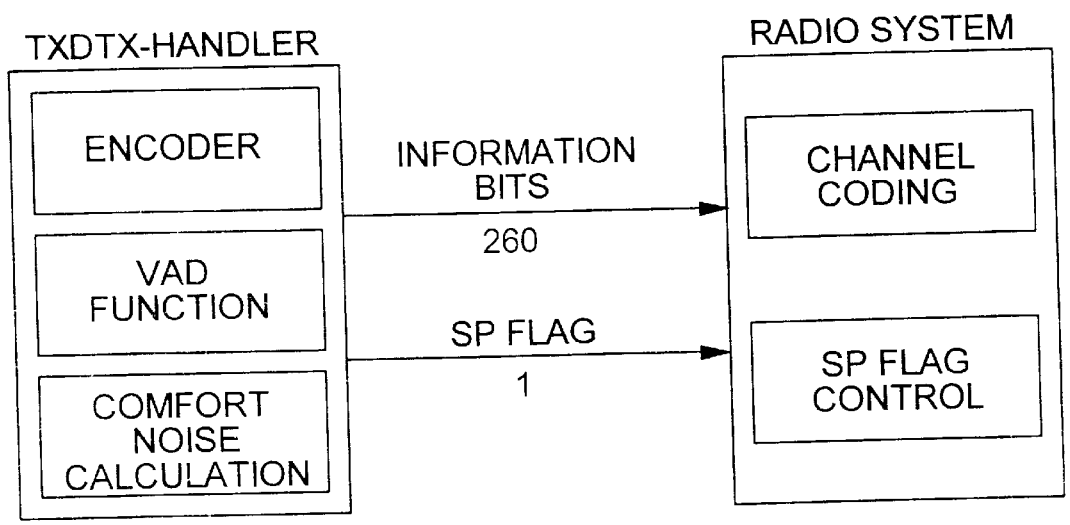
FIGS. 3 and 4 are block diagram illustrations of TXDTX and RXDTX handlers.

The function which handles the discontinuous transmission on the transmitting side, i.e the TXDTX handler (Transmit DTX), is illustrated in FIG. 3. It sends speech frames to the communication system continuously. The speech frames are marked with an SP (Speech) flag in the control bits, indicating whether said frame includes speech or whether it is a so-called SID frame (Silence Descriptor) which contains information on the background noise for comfort noise generation on the receiving end. The SP flag is determined on the basis of a VAD flag obtained from a voice activity detection unit. As the VAD flag goes to zero, indicating that no speech is detected in the signal, a transition of the SP flag into zero will also occur after the number of frames required for calculating the background noise parameters have passed. The transmitting unit of the radio system further sends this frame, which is marked by zero SP flag and includes the noise parameters, after which transmission on the radio path is discontinued. The TXDTX handler does, however, continue to send frames containing noise information to the radio system which, at predetermined time intervals, sends one of them to the radio path in order to update the noise parameters of the receiving side. When speech is again detected in the signal, the SP flag is set to 1 and continuous transmission is recommenced.

In discontinuous transmission, a function is thus required on the transmitting side for calculating the background noise parameters. The aforementioned encoder at the transmitting side generates the parameters that represent background noise. Out of the normal parameters, those parameters that provide information on the level and spectre of the noise are selected to represent background noise, i.e. block maxims and reflection coefficients, which have been converted into LAR coefficients. Over a time period of four speech frames, average values are further calculated for the selected parameters. One common value of four block maxims is calculated over the time period of four speech blocks. These parameters are transmitted over the radio path as described above. Thus, only part of the speech parameters are sent, and some of the parameters are substituted for a SID code word which consists of 95 zeros. The rest of the parameters that are not used are coded to 0.

2.2 Receiving Side Functions (Transcoder Unlink DTX)

Figure 4:
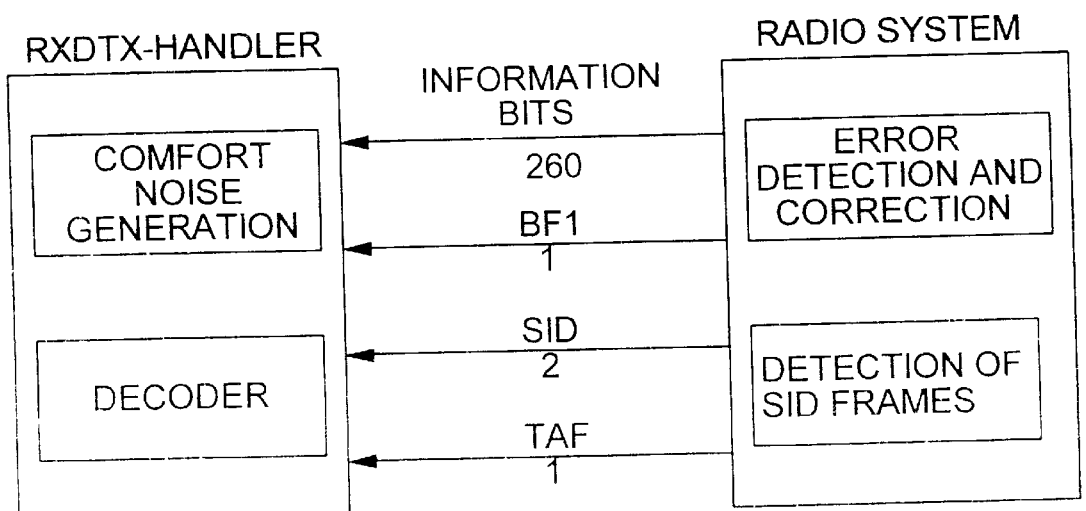

The discontinuous transmission of the receiving side is correspondingly handled by a RXDTX (Receive DTX) handler whose structure is illustrated in FIG. 4. It receives frames from the radio system, and handles them on the basis of the three flags obtained in the control bits.

The BFI flag (Bad Frame Indicator) indicates whether the frame in question contains sensible information. I.e. if the frame has been corrupted, for example, on the radio path in such extent that it cannot be reconstructed in the radio section of the base station, the BFI flag is used for marking said frame defective. As such a bad frame is received, i.e. a frame with a BFI flag value 1, the speech parameters of said frame are substituted for the speech parameters of the previous frame before decoding. If several frames that are marked by a BFI flag are received, muting operations according to the GSM recommendations are performed. The only exception to the aforementioned handling of a BFI flag is an uplink-DTX situation, i.e. a valid SID updating frame has been received, but no normal speech frame with a BFI value 0 has been received after that. In such an uplink DTX situation, a frame with a BFI flag only means that comfort noise generation should be continued. Alternatively, this can be carried out by sending idle frames.

The SID flag consists of two bits and it is used for classifying the SID frame sent by the radio system based on errors in the specifically formed code word in the frame. A decision is made on the basis of this classification on how the frame will later be used. If the SID has the value 2 and the BFI has the value 0, it is a valid SID frame that can be used for updating the noise parameters.

A TAF flag (Time Alignment Flag) is used for indicating whether the frame in question has been used in signalling outside of this sub-system, i.e. its purpose is mainly to indicate when the next SID updating is expected.

The operations relating to comfort noise generation, such as muting, are carried out in accordance with the GSM recommendations 06.11 or 06.21 and 06.21 or 06.22 and 06.31 or 06.41 depending on the combinations of the aforementioned three flags, but generally speaking it can be said that the comfort noise generation is started or comfort noise is updated upon receiving a new valid SID frame.

The comfort noise generation correspondingly employs the decoder described above for generating background noise. The averaged parameters received from the transmitting side are used in the normal manner, and they are maintained unchanged until the next updating. The other parameter values are set so that the location of a decimation grid and 13 RPE samples are frame-specifically allotted integers uniformly distributed within the range 0–3 and 1–6, respectively. The delay parameter a of the long term residual signal is set in the sub-frames to values 40, 120, 40, 120, in that order, i.e. the minimum and maximum values in turn, and the gain parameter of the long term residual signal is set to zero in all the sub-frames.

3. Prior art MMC Call

When a mobile station MS originating call is made in the prior art mobile communication system, the associated signalling is forwarded from a base station BTS to a mobile services switching center MSC which in turn establishes connection, for example, between the PSTN line and the line of the aforementioned A interface. At the same time, the transcoder unit TRCU is allocated and connected to the A interface line. The mobile services switching center MSC further commands the base station controller BSC to connect the base station BTS, which the calling mobile station MS communicates with, to the A interface line allocated. The base station controller BSC establishes connection between the A interface line and the base station BTS which the calling MS communicates with. The base station BTS independently handles call establishment on the radio path. Thereby, a connection is established having in series a mobile station MS, a base station BTS, a base station controller BSC, a transcoder unit TRCU and a mobile services switching center MSC. Thus, this connection is used for sending coded speech between MS-TRCU, and TRAU frames between BTS-TRCU.

If the prior art mobile communication system handles an MMC (Mobile to Mobile Call) between two mobile stations MS, the call connecting proceeds, as far as the calling mobile station is concerned, similarly to above, but now the mobile services switching center establishes the connection between the A interface line allocated for the calling MS and the A interface line allocated for the called MS. The A interface line of the called MS is connected to a second transcoder unit. From said second transcoder unit, a connection will be established to the base station of the called mobile station MS. In other words, for each MMC call two transcoder units are connected in series, and the call is encoded and decoded twice. This is known as tandem coding, which deteriorates speech quality due to the extra encoding and decoding.

4. MMC Call According to the Invention

In the present invention, an MMC call can be connected according to normal procedures of the mobile communication network so that the connection comprises two transcoders TRCU in a tandem configuration. Tandem coding can be avoided in MMC calls by sending the frames received from a base station BTS with minor changes through said two tandem coded transcoders TRCU to a second base station BTS without the transcoders carrying out any speech encoding or decoding. As a result, speech coding is only carried out in the mobile station MS and the speech parameters are simply forwarded through the mobile communication network, which considerably improves speech quality compared to the conventional tandem coding.

The transcoders can implement several different coding types, such as full rate and half rate, and contain a tandem prevention mode according to the invention for each coding type. Alternatively, transcoders TRCU representing different types may be grouped in pools from which an appropriate transcoder may be selected on a call by call basis.

An Abis interface may be maintained the same with the exception of the additions to the signalling procedures described here. In the TRAU frames of the Abis interface, the only additions in the primary embodiment of the invention will in the uplink be indication of the tandem prevention mode, and in the downlink informing of lack of synchronization or synchronization errors in the A interface, as will be described below.

The following will describe an arrangement according to the preferred embodiment of the invention for preventing tandem coding in an MMC call within one mobile services switching center MSC. For reasons of clarity, a three-part description will be given: uplink transfer BTS-TRCU, transfer between transcoders TRCU-TRCU, and downlink transfer TRCU-BTS.

At first, in FIG. 1 it is assumed that there is within a base station BTS1 coverage area a mobile station MS1 which initiates an MMC call set up to a second mobile station MS2 which is located within a coverage area of a base station BTS3. In such a case, the normal call establishment for a mobile originating call MOC is carried out according to the GSM recommendations. The call establishment involves signalling between the MS1 and the base station controller BSC1, as well as signalling between mobile services switching center MSC1 and the visitor location register VLR (not shown) for the purpose of subscriber authentication and exchange of encryption keys. The MSC1 receives from the MS1 the directory-number of the B subscriber, and as it notices that the B subscriber is another mobile subscriber it performs an interrogation according to the GSM recommendations to the home location register HLR (not shown) of the B subscriber. Due to the fact that the B subscriber is within the MSC1 area, the HLR responds by giving the MSC1 as the routing address. Consequently, the MSC1 performs, according to the GSM recommendations, call establishment of a mobile terminating call MTC, which call establishment involves a database enquiry to a visitor location register VLR, paging of the mobile station MS2, authentication, exchange of encryption keys, etc.

The MSC1 reserves a dedicated PCM line of the A interface for both mobile stations MS1 and MS2. In addition, the MSC1 reserves the transcoder unit TRCU1 for the MS1, and for the MS2 the transcoder TRCU2 which is connected to the corresponding PCM lines of the A interface. The MSC1 establishes the connections MS1-TRCU1 and MS2-TRCU2 as well as a connection between the A interface line which is allocated for the MS1 and the A interface line which is allocated for the MS2. Thus, between the MS1 and the MS2 there is a speech connection having two transcoders TRCU1 and TRCU2 connected in series. Between the transcoders, there exists the A interface, i.e. a digital PCM connection.

In the call establishment, GSM recommendations are strictly followed. However, call set-up may be changed so that when the MSC1 detects an MMC call and a need for preventing tandem coding, it signals information concerning it to the base stations BTS1 and BTS3. This piece of information may be included in the existing messages.

4.1. Uplink Transfer BTS-TRCU

In the following, only the uplink transfer BTS1-TRCU1 is described. The uplink transfer BTS3-TRCU2 is carried out by the very same principle. As the BTS1 channel codec unit CCU, determined in the GSM recommendation 08.60, receives information on the tandem prevention mode, it provides the uplink TRAU frames with information that indicates to the transcoder TRCU1 that the frames are associated with an MMC call and no speech decoding is to be carried out to them. This information can be transferred in one of the free control bits C18–C21 of the uplink TRAU frame, or a combination of them. For the tandem prevention operation, it is also possible to determine a new frame type, of which control bits C1–C4 notify. In the example below, tandem prevention mode is indicated by the control bit C21, i.e. C21=0=tandem prevention mode and C21=1=normal mode.

It must, however, be noted that the implementation of the invention is possible without the TRAU frames transferring any kind of information on tandem prevention. In other words, the mobile services switching center MSC does not signal to the base station that the call is an MMC call, and neither is the control bit of the TRAU frame, e.g. C21, in the base station uplink direction used for informing of tandem prevention. Neither does the TRCU1 in such a case check the control bit C21 but continuously operates, as will be described below, with the control bit value C21=0, i.e. in tandem prevention mode. The example, however, describes an embodiment employing signalling and the C21 control bit, because it is the more complicated one out of these two.

Figure 5:
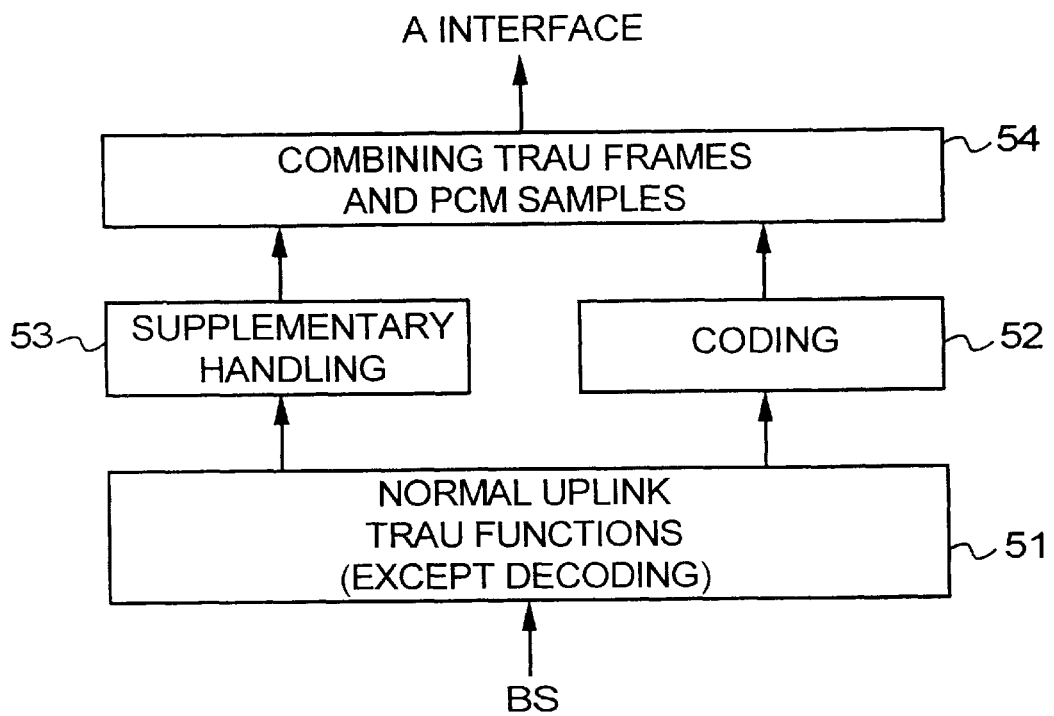
FIG. 5 shows a flow chart illustrating uplink direction functions according to the present invention.

FIG. 5 shows a flow chart illustrating the transcoder TRCU1 uplink direction functions according to the invention. Upon receiving a TRAU speech frame from the base station BTS1, the transcoder TRCU1 carries out all the procedures (block 51) for the received TRAU frame that are determined in the GSM recommendations, except speech decoding. The TRAU frames handled in the block 51 are fed to speech decoding 52 and supplementary processing 53.

In addition, the block 51 checks the state of the control bit C21 in the frame. If the control bit C21 is in state 1, the TRCU1 operates in the normal mode of operation and transfers the TRAU frame to speech decoding, but not to supplementary processing 53. In such a case, the operation of TRCU1 is entirely in accordance with the GSM recommendations.

Speech coding 52 is in accordance with the GSM recommendations, and produces from the speech coding parameters a digital speech signal which is applied to a pulse code modulation (PCM) block 54, which, by means of pulse code modulation (PCM) in accordance with, for example, CCITT recommendations G.711–G.716, converts the digital speech signal to a bit rate of 64 kbit/s. The pulse code modulation (PCM) at the rate of 64 kbit/s functions so that the speech signal is sampled every 125 microseconds, i.e. the rate of sampling is 8 kHz, and the amplitude of each sample is quantized to an 8 bit code by using A-law or u-law coding. The block 54 sends the PCM speech samples to TRCU2 through the A interface.

If, however, the block 51 detects that the BTS1 has, despite all, inserted the TRAU frame control bit C21=0, the TRCU1 shifts to tandem prevention mode. In tandem prevention mode, the block 51 sends the TRAU frame to both decoding 52 and supplementary processing 53. The speech signal decoded in block 52 is supplied to PCM block 54 in which it is coded into PCM speech samples as in normal mode of operation.

The supplementary processing block 53 produces a TRAU frame in accordance with the GSM recommendation 08.60 (or 08.61) to be forwarded to a second transcoder through the PCM block 54 and the A interface. As decoding is not performed, the TRAU frames that are forwarded to the A interface comprise essentially the same speech parameters and control data as the frames received from the base station BTS1. The block 53 does, however, check the control bits of the received TRAU frame and may depending on their contents carry out supplementary functions which may change the contents of the TRAU frames that are sent to the A interface.

Upon receiving a bad uplink TRAU frame, in other words a TRAU frame marked with a BFI flag value 1, the block 53 substitutes the speech parameters of said uplink TRAU frame with the speech parameters of the previous uplink TRAU frame and sets the value of the BFI flag to 0 prior to sending said TRAU frame forward to the A interface and TRCU2. If several uplink TRAU frames that are marked with a BFI flag are received, the block 53 carries out muting procedures according to the GSM recommendations to the values of the speech parameters, and sets the BFI flag values to 0 in the bad TRAU frames prior to their sending to the A interface, but decoding is not performed in this case either.

The only exception is a situation of an uplink TDX whereby an idle speech frame or a TRAU frame marked with a BFI flag value 1 only mean that the block 53 should continue generating comfort noise.

When the block 53 receives a valid SID updating, it functions the way it does in a normal uplink DTX situation, i.e. comfort noise generation is activated or comfort noise is updated to the parameters, but decoding is yet again not performed.

In a nutshell, it can be said that all the operations determined by the GSM recommendation 06.11 or 06.21 are performed with the exception of decoding, and the BFI flag is set to 0 and the uplink DTX is handled as follows. Upon reception of SID frames according to the GSM recommendation 06.31 or 06.41, comfort noise generation according to the GSM recommendation 06.12 or 06.22 is performed, but again in such a manner that decoding is not carried out, but the modified parameters are packed back to the frames. Control bits are not changed at all in these flags that will be sent forward to the A interface.

In the TRAU frames according to the GSM recommendation 08.61, the control bits further comprise a UFI flag and a check sum for cyclic redundancy check (CRC), which may cause changes in the speech parameters of the received TRAU frame prior to sending the TRAU frames forward to the A interface. For the TRAU frames in accordance with the GSM recommendation 08.61, the transcoder TRCU1 must, among other things, calculate a new CRC check sum in case it has been necessary to change the parameters associated with it.

The block 53 transfers the TRAU frames handled in tandem prevention mode to the PCM block, which incorporates them in the normal PCM speech samples by inserting the TRAU frames in a "subchannel" formed by the least significant bit (e.g. 8 kbit/s speech coding) or two least significant bits (e.g. 16 kbit/s speech coding). It is possible to employ even a higher number of least significant bits, but that would result in a more noticeable deterioration in speech quality.

Figure 6:
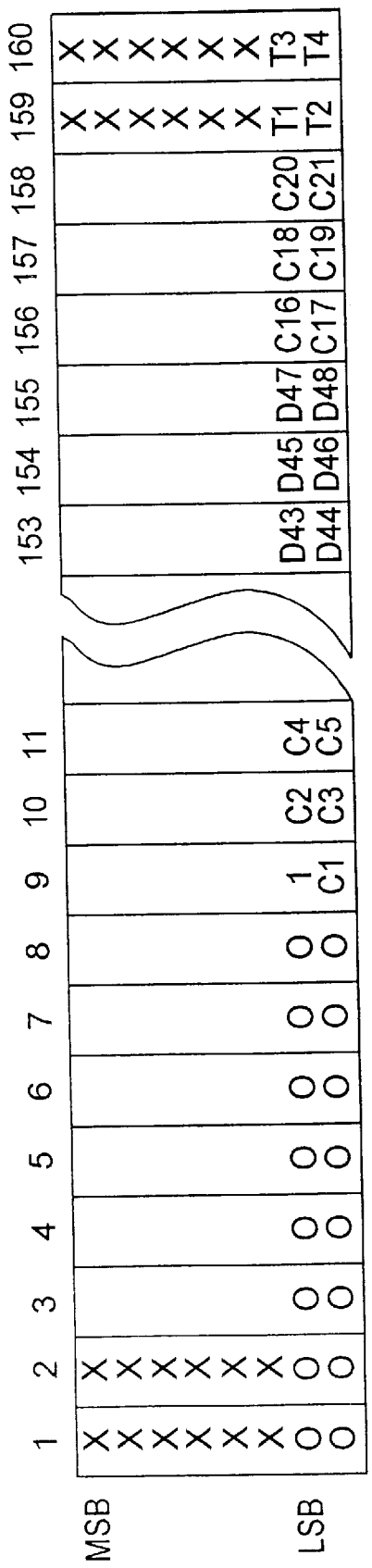
FIG. 6 shows insertion of a TRAU frame according to FIG. 2 into 160 successive 8 bit PCM samples.

FIG. 6 illustrates the insertion of a TRAU frame according to FIG. 2 into 160 successive 8 bit PCM samples. Into each PCM sample, two bits of a TRAU frame have been inserted in place of two least significant bits of the PCM speech sample. The PCM samples 1–8 contain synchronization zeros, the PCM samples 9–18 control bits C1–C15, the PCM samples 19–155 data bits, and the PCM samples 156–160 control bits C16–C21 and T1–T4. The six most significant bits of the PCM samples are original bits of the PCM speech sample (marked with the symbol x).

In the preferred embodiment of the invention, if TRCU1 is in normal state (C21=1), the PCM block 54 does not insert the bits of the TRAU frame into the two least significant bits of the PCM speech sample, in other words all the bits of the sample sent to the A interface are original bits of the PCM sample. This is how unnecessary deterioration of speech quality can be avoided due to tandem prevention not being employed in calls having, e.g., a PSTN subscriber as one party.

It is, however, possible that the TRCU1 is continuously in tandem prevention mode, i.e. it always carries out the insertion of TRAU frames in the PCM samples. It such a case, the receiving end makes the decision whether to use the PCM samples or the TRAU frames. An advantage here is that the mobile services switching center MSC and the base stations BTS1 do not have to know that the call is an MMC call as all the modifications required by the invention are concentrated at the transcoder. In such a situation, the control bit C21 is not used the way described above, either. A disadvantage that results is a slightly poorer speech quality in normal calls to the PSTN. If frames in accordance with the recommendation 08.61 and a subchannel formed of one least significant bit are utilized, the deterioration cannot be noticed in practice.

The transcoder TRCU2 also contains a transmit unit according to FIG. 5 for traffic in the uplink direction.

4.2. Transfer between transcoders TRCU1–TRCU2

The TRCU2 handles the uplink TRAU frames it receives from the base station BTS3 the same manner as described above in connection with the transcoder TRCU1, and goes to tandem prevention mode upon detecting that C21=0, or is in the prevention mode permanently. Similarly, the TRCU1 handles the TRAU frames and the PCM samples received from the A interface as will be described below in connection with TRCU2.

The TRAU frames in accordance with the GSM recommendations 08.60 or 08.61 are transferred between the transcoders TRCU1 and TRCU2 through the A interface in a subchannel formed by one or more least significant bits of the PCM speech samples. In the transfer between the transcoders TRCU1 and TRCU2, it is furthermore possible to use the same synchronization methods according to the GSM recommendations 08.60 and 08.61 that are used between the base station BTS1 and the transcoder TRCU1.

4.3. Downlink Transfer TRCU2–BTS3

In the following, only the reception at the transcoder TRCU2 from the A interface, and the downlink transfer TRCU2–BTS3 are described. The very same principle can be applied to the reception from the A interface at the transcoder TRCU1 and the downlink transfer TRCU1–BTS3.

Figure 7:
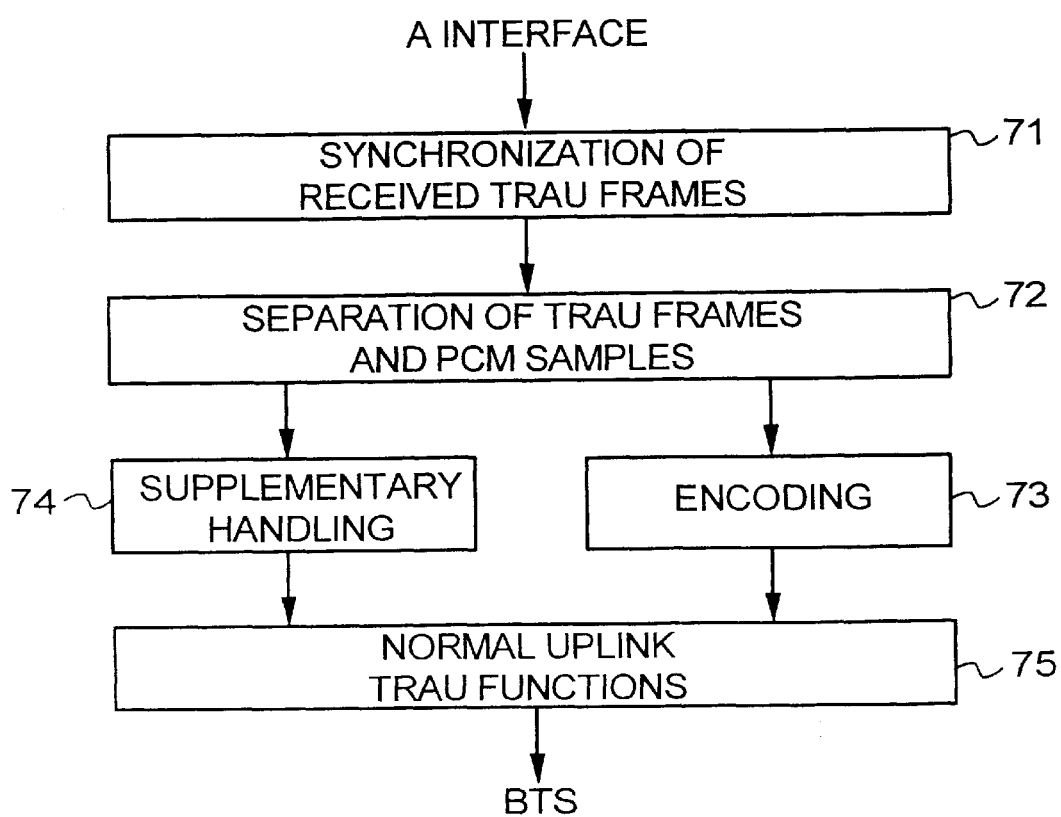
FIG. 7 shows a flowchart illustration the transcoder TRUs functions in the downlink direction according to the invention.

FIG. 7 shows a flow chart illustrating the transcoder TRCU2 functions in the downlink direction according to the invention. In accordance with the GSM recommendations 08.60 or 08.61, the synchronization block 71 of the receiving transcoder TRCU 2 continuously tries to find synchronization in the subchannel in the PCM samples received from the A interface, i.e. in the one or two least significant bits. The synchronization with the TRAU frames takes place by means of the synchronization zeros and ones in the frames. At the beginning of the call, when synchronization has not yet been found, or during the call, when synchronization has been lost, a sufficient number of TRAU frames is awaited to be received in order to assure that a 8 or 16 kbit/s subchannel containing TRAU frames has been found, and not a random synchronization pattern in the least significant bits of normal PCM samples. Synchronization with the frames is carried out continuously, and the time period used for analysis is altered in accordance with possible timing variations.

A separation block 72 separates the PCM speech samples to an encoding block 73 and the TRAU frames to a supplementary processing block 74.

Entirely, in accordance with the GSM recommendations, the encoding block 73 carries out an encoding for the PCM speech samples into speech encoding parameters of the lower rate speech encoding method. The encoding of the PCM samples takes place continuously regardless of whether synchronization with TRAU frames has been achieved or not.

If synchronization with TRAU frames has not taken place, or verification of synchronization is awaited, the speech coding parameters that have been encoded from the PCM speech samples are forwarded from the encoding block 73 to a processing block 75. The processing block 75 inserts the speech coding parameters in the TRAU frames and carries out all the procedures for them that are determined for the transcoder TRCU2 in the GSM recommendations, prior to transmitting the frames in accordance with the GSM recommendation 08.60 or 08.61 to the base stations BTS3.

If synchronization with the TRAU frames has taken place, the speech coding parameters are not forwarded from the encoding block 73 to the processing block 75. Instead, the processing block 75 is provided with the TRAU frames received from the A interface, which TRAU frames have been processed in the supplementary processing block 74. For these TRAU frames, the processing block 75 performs all the procedures determined for the transcoder in the GSM recommendations, and produces a TRAU frame in accordance the GSM recommendation 08.60 (or 08.61) to be forwarded through the Abis interface to the BTS3. As the speech encoding is not carried out, the TRAU frames to be forwarded contain essentially the same speech parameters and control data as the TRAU frames received through the A interface. The supplementary processing block 74 does, however, check the control bits of the TRAU frame received from the A interface and may depending on their contents carry out supplementary functions which may change the contents of the TRAU frames that are sent to the BTS3.

In the following, the supplementary features of the supplementary processing block 74 are described.

If the TRCU2 by means of the uplink TRAU frames sent by the BTS3, or by some other means, is set in downlink DTX off mode, the block 74 forwards the TRAU frames received from the A interface by only changing the type of the frames to that of normal downlink speech frames. In other words, in the frames according to the GSM recommendation 08.60, the supplementary processing block 74 sets the control bits C1–C4 to indicate that the TRAU frame is a downlink frame, i.e. C1C2C3C4=1110, and the SP bit and the spare bits always to 1.

If the downlink DTX is set on, the supplementary processing block 74 sends the TRAU frames forward by changing the type of the TRAU frames received from the A interface to that of normal downlink speech frames, if they are normal speech frames as to their control information. In all the TRAU frames received from the A interface that can, on the basis of control bits, be interpreted as comfort noise generation frames, i.e. in frames that the TRCU1 would interpret as belonging to comfort noise generation frames of the uplink DTX, the SP flag is kept 0 and a SID code word is set to unnecessary speech parameters, and the rest of the unnecessary parameters are also set to 0. As a normal speech frame is received from the A interface, the SP is again set to 1 in these downlink frames.

The transcoder TRCU1, too, contains a receiving unit according to FIG. 7 for processing speech information in the downlink direction.

It is also possible to transfer the functions of the transcoders TRCU1 and TRCU 2 described above so that the TRCU2 downlink supplementary processing block 74 carries out all the modifications to the frames received from the BTS1 (i.e. also the functions determined above for the TRCU1 uplink supplementary processing block 53), and the TRCU1 downlink supplementary processing block 74 carries out all the modifications to the TRAU frames received from the BTS2 (i.e. also all the functions determined for the TRCU2 uplink supplementary processing block 53) whereby a configuration slightly different regarding the location of the functions is obtained. In such a case the TRCU1 forwards the uplink frames as such to the TRCU2, and the TRCU2 correspondingly to the TRCU1.

The example above describes an MMC call within the area of one mobile services switching center MSC1 The invention can also be applied to an MMC call with mobile stations MS located in different mobile services switching centers.

Let us assume that in the system according to FIG. 1 a MS1 located within the area of a base station BTS1 and a mobile services switching center MSC1 places a call to a mobile station MS3 located within the area of a base station BTS4 and mobile services switching center MSC2. The beginning of the MMC call proceeds as in the previous example, but now the home location register HLR returns the address of the mobile services switching center MSC2 to the mobile services switching center MSC1. The MSC1 routes the call to the MSC2 and includes information in the signalling that the call is an MMC call. The MSC1 performs the allocation of the transcoder TRCU1 and the call establishment to the mobile station MS1 direction, as in the previous example. The MSC2, in turn, allocates the transcoder TRCU3 and carries out the call establishment to the mobile station MS3 the same way that the MSC1 performed the allocation of the transcoder TRCU2 and the call establishment to the mobile station MS2 in the previous example. A connection is established between the mobile services switching centers MSC1 and MSC2, and the transcoders TRCU1 and the TRCU3 are connected in series. Following this, the TRAU frame uplink transfer between BTS-TRCU, the downlink transfer between TRCU-BTS and the transfer between the transcoders are performed, as in the previous example.

The figures and their description are only intended to illustrate the present invention. It should, however, be understood that changes can be made to the embodiments of the invention without departing from the scope and spirit of the attached claims.

I claim:

1. A transcoder, for a mobile communication system which uses a speech coding method which reduces a transmission rate of speech on a radio path, said transcoder comprising:
   a speech coder which encodes a speech signal to be transmitted to at least one mobile station into speech parameters, and decodes speech parameters received from at least one mobile station into a speech signal according to said speech coding method; and
   a PCM coder which transmits an uplink speech signal to and receives a downlink speech signal from a PCM interface in the form of PCM speech samples,
   wherein said transcoder transmits and receives said speech parameters in a subchannel formed by at least one least significant bit of said PCM speech samples simultaneously with said PCM speech samples, in order to prevent tandem coding of speech in a mobile-to-mobile call.

2. The transcoder as claimed in claim 1, wherein said speech parameters are transmitted in speech frames through said subchannel, said speech frames also carrying control and synchronization information, and
   said speech frames received from said subchannel are downlink frames, and said speech frames being sent to said subchannel are uplink frames.

3. The transcoder as claimed in claim 1, wherein said transcoder forwards said speech parameters received from said at least one mobile station both as decoded PCM speech samples and as undecoded speech parameters in said subchannel.

4. The transcoder as claimed in claim 2, wherein said transcoder forwards said speech parameters received in a speech frame from said subchannel to said at least one mobile station without encoding, but possibly modified according to control information of said uplink frame,
   said speech coder continuously encode PCM speech samples into speech parameters, and
   said transcoder transmits said speech parameters encoded from the PCM speech samples to said at least one mobile station, if said transcoder does not receive speech parameters from said subchannel properly.

5. The transcoder as claimed in claim 4, wherein said transcoder is synchronized to said synchronization information received from said subchannel, and wherein said transcoder continuously searches said frame synchronization in said speech frames received from said subchannel and recognizes said speech frames as properly received, if synchronization is found.

6. The transcoder as claimed in claim 2 or 3, wherein said speech frames are transcoder and rate adaptation unit (TRAU) frames in accordance with GSM recommendation 08.60 or 08.61.

7. The transcoder as claimed in claim 2, wherein said transcoder is a remote transcoder located remote from said at least one base station, said remote transcoder being arranged to communicate with said at least one base station by using speech frames that are substantially similar to speech frames used in said subchannel, and wherein synchronization between transcoders is substantially similar to synchronization between said at least one base station and said transcoder.

8. The transcoder as claimed in claim 7, wherein a bad uplink frame contains a bad frame indicator, and
   said bad transcoder responds to said bad frame indicator in said uplink frame received from said at least one base station by inserting speech encoding information of a previous speech frame in a speech frame being sent forward and removing said bad frame indicator.

9. The transcoder as claimed in claim 7, wherein said transcoder responds to said bad frame indicator in several successive uplink frames from said at least one base station by carrying out predetermined muting operations to speech encoding information except decoding, prior to packing said speech encoding information into frames and sending said speech frames forward, and by removing said bad frame indicator.

10. The transcoder as claimed in claim 9, wherein said speech frames are transcoder and rate adaptation unit (TRAU) frames in accordance with GSM recommendation 08.60 or 08.61, and
    said muting operation corresponds with GSM recommendation 06.11 or 06.21 without decoding.

11. The transcoder as claimed in claim 7, wherein said speech frames are transcoder and rate adaptation (TRAU) frames in accordance with GSM recommendation 08.60 or 08.61, and
    all operations associated with comfort noise generation are carried out as determined in any of the GSM recommendations 06.11, 06.21, 06.12, 06.22, 06.31, and 06.41.

12. The transcoder as claimed in claim 7, wherein said transcoder responds to receiving, during discontinuous transmission in the uplink direction, a transcoder and rate adaptation unit (TRAU) frame which is a valid SID frame according to the GSM recommendation 06.31 or 06.41 by carrying out comfort noise updating and generation according to GSM recommendation 06.12 or 06.22, without decoding.

13. The transcoder as claimed in claim 7, wherein said speech transcoder is responsive to receiving, during discontinuous transmission in the uplink direction, a frame which is marked with a BFI bit value 1, indicating it as a bad frame or an idle speech frame for continuing generation of comfort noise according to the GSM recommendation 06.12 or 06.22 without decoding.

14. The transcoder as claimed in claim 13, wherein said transcoder responds to receiving a transcoder and rate adaptation unit (TRAU) frame, during discontinuous transmission in the uplink direction, from an A interface which a transcoder and rate adaptation unit (TRAU) frame can be interpreted as a frame for comfort noise updating or generating according to GSM recommendation 06.31 or 06.41, by changing the frame downlink direction to a frame having an SP bit value of 0, a SID code word set to an unused speech parameters, and the other unused speech parameters having a value of 0.

15. The transcoder as claimed in claim 7, wherein said speech frames are transcoder and rate adaptation unit (TRAU) frames corresponding with GSM recommendation 08.60 or 08.61, and
    said transcoder responds to receiving from an A interface, a TRAU frame, which is a normal speech frame, by changing the type of frame to a normal downlink speech frame and setting an SP bit and spare bits to 1.

16. The mobile communication system as claimed in claim 7, wherein synchronization between said at least one base station and said transcoder as well as synchronization between transcoders correspond with GSM recommendation 08.60 or 08.61.

17. The transcoder as claimed in claim 7, wherein said speech frames are transcoder and rate adaptation unit (TRAU) frames corresponding with GSM recommendation 08.60 or 08.61, and wherein said base station uplink frames contain a speech encoding disabled indicator in a mobile-to-mobile call, said speech encoding disabled indicator comprises a value determining the new TRAU frame type in the frame type field, or a TRAU frame of free control bits or a combination thereof, according to GSM recommendation 08.60 or 08.61.

18. The transcoder as claimed in claim 1, 2, or 3, wherein said speech frames are transcoder and rate adaptation unit (TRAU) frames corresponding with GSM recommendation 08.60 or 08.61, and said transcoder responds to receiving from said PCM interface a TRAU frame, which is a normal speech frame, by changing the type of frame to a normal downlink speech frame and sending said frame forward to said at least one base station.

19. The transcoder as claimed in claim 1, wherein said speech frames are transcoder and rate adaptation unit (TRAU) frames corresponding with GSM recommendation 08.60 or 08.61, and wherein said transcoder carries out all normal operations, except decoding to uplink frames including a speech encoding disabled indicator.

20. The transcoder as claimed in claim 3, wherein said transcoder forwards said speech parameters received in a speech frame from said subchannel to said at least one mobile station without encoding, but possibly modified according to control information of said uplink frame, said speech coder continuously encode PCM speech samples into speech parameters, and said transcoder transmits said speech parameters encoded from the PCM speech samples to said at least one mobile station, if said transcoder does not receive speech parameters from said subchannel properly.

21. The transcoder as claimed in claim 20, wherein said transcoder is synchronized to said synchronization information received from said subchannel, and wherein said transcoder continuously searches said frame synchronization in said speech frames received from said subchannel and recognize said speech frames as properly received, if synchronization is found.

22. The transcoder as claimed in claim 3, wherein said transcoder is a remote transcoder located remote from said at least one base station, said remote transcoder being arranged to communicate with said at least one base station by using speech frames that are substantially similar to speech frames used in said subchannel, and wherein synchronization between transcoders is substantially similar to synchronization between said at least one base station and said transcoder.

23. The transcoder as claimed in claim 22, wherein a bad uplink frame contains a bad frame indicator, and said bad transcoder responds to said bad frame indicator in said uplink frame received from said at least one base station by inserting speech encoding information of a previous speech frame in a speech frame being sent forward, and removing said bad frame indicator.

24. The transcoder as claimed in claim 22, wherein said transcoder responds to said bad frame indicator in several successive uplink frames from said at least one base station by carrying out predetermined muting operations to speech encoding information except decoding, prior to packing said speech encoding information into frames and sending said speech frames forward, and by removing said bad frame indicator.

25. The transcoder as claimed in claim 24, wherein said speech frames are transcoder and rate adaptation unit (TRAU) frames in accordance with GSM recommendation 08.60 or 08.61, and said muting operation corresponds with GSM recommendation 06.11 or 06.21 without decoding.

26. The transcoder as claimed in claim 22, wherein said speech frames are transcoder and rate adaptation (TRAU) frames in accordance with GSM recommendation 08.60 or 08.61, and all operations, such as muting, associated with comfort noise generation are carried out as determined in any of the GSM recommendations 06.11, 06.21, 06.12, 06.22, 06.31, and 06.41.

27. The transcoder as claimed in claim 22, wherein said transcoder responds to receiving, during discontinuous transmission in the uplink direction, a transcoder and rate adaptation unit (TRAU) frame which is a valid SID frame according to the GSM recommendation 06.31 or 06.41 by carrying out comfort noise updating and generation according to GSM recommendation 06.12 or 06.22, without decoding.

28. The transcoder as claimed in claim 22, wherein said speech transcoder is responsive to receiving, during discontinuous transmission in the uplink direction, a frame which is marked with a BFI bit value 1, indicating it as a bad frame or an idle speech frame for continuing generation of comfort noise according to the GSM recommendation 06.12 or 06.22 without decoding.

29. The transcoder as claimed in claim 28, wherein said transcoder responds to receiving a transcoder and rate adaptation unit (TRAU) frame, during discontinuous transmission in the uplink direction, from an A interface which a TRAU frame can be interpreted as a frame for comfort noise updating or generating according to GSM recommendation 06.31 or 06.41, by changing the frame downlink direction to a frame having an SP bit value of 0, a SID code word set to an unused speech parameters, and the other unused speech parameters having a value of 0.

30. The transcoder as claimed in claim 22, wherein said speech frames are transcoder and rate adaptation unit (TRAU) frames corresponding with GSM recommendation 08.60 or 08.61, and said transcoder responds to receiving from an A interface, a TRAU frame, which is a normal speech frame, by changing the type of frame to a normal downlink speech frame and setting an SP bit and spare bits to 1.

31. The transcoder as claimed in claim 22, wherein said speech frames are transcoder and rate adaptation unit (TRAU) frames corresponding with GSM recommendation 08.60 or 08.61, and wherein said base station uplink frames contain a speech encoding disabled indicator in a mobile-to-mobile call, said speech encoding disabled indicator comprises a value determining the new TRAU frame type in the frame type field, or a TRAU frame of free control bits or a combination thereof, according to GSM recommendation 08.60 or 08.61.

32. The mobile communication system as claimed in claim 22, wherein synchronization between said at least one base station and said transcoder as well as synchronization between transcoders correspond with GSM recommendation 08.60 or 08.61.

33. A method for preventing tandem coding of speech in a mobile-to-mobile call, said method comprising:

encoding a speech signal by a speech coding method which reduces transmission rate and provides speech parameters;

transmitting said speech parameters over a radio interface to a first transcoder in the mobile communication network;

decoding said speech parameters by said speech coding method to restore said speech signal;

transmitting said speech signal from said first transcoder to a second transcoder as PCM speech samples; and transmitting said speech parameters, received over said radio interface, from said first transcoder to said second transcoder simultaneously with said PCM speech samples in a subchannel formed by at least one least significant bit of said PCM speech samples.

34. An arrangement for preventing tandem coding of speech in a mobile communication system in which mobile stations and the mobile communication network include speech coders which transmit a speech signal over a radio path in the form of speech coding parameters at a speech coding rate, and in which a mobile-to-mobile call includes, in the mobile communication network, a tandem connection of two speech coders having a normal PCM interface between speech coders in said tandem connection, wherein at least one of said speech coders being arranged to provide a subchannel in at least one least significant bit of PCM speech samples in said PCM interface for forwarding said speech coding parameters provided by said at least one speech coder in at least one mobile station through the mobile communication network without decoding or encoding being carried out in said speech coders of the mobile communication network.

35. A transcoder for a mobile communication system which uses a speech coding method which reduces a transmission rate of speech on a radio path, said transcoder comprising:

a speech coder which encodes a speech signal to be transmitted to at least one mobile station into speech parameters, and decodes speech parameters received from at least one mobile station into a speech signal according to said speech coding method; and a PCM coder which transmits an uplink speech signal to and receives a downlink speech signal from a PCM interface in the form of PCM speech samples, wherein said transcoder transmits and receives said speech parameters in a subchannel formed by at least one least significant bit of said PCM speech samples simultaneously with said PCM speech samples, in order to prevent tandem coding of speech in a mobile-to-mobile call, wherein said transcoder forwards said speech parameters received in a speech frame from said subchannel to said at least one mobile station without encoding, but possibly modified according to control information of said uplink frame, said speech coder continuously encode PCM speech samples into speech parameters, and said transcoder transmits said speech parameters encoded from the PCM speech samples to said at least one mobile station, if said transcoder does not receive speech parameters from said subchannel properly.

* * * * *

UNITED STATES PATENT AND TRADEMARK OFFICE
CERTIFICATE OF CORRECTION

PATENT NO. : 5,991,716
DATED : November 23, 1999
INVENTOR(S) : LEHTIMAKI

It is certified that error appears in the above-identified patent and that said Letters Patent is hereby corrected as shown below:

On the title page, item

[73] Asignee: Nokia Telecommunications Oy, Espoo, Finland (the "s" is missing on the patent from Telecommunications)

Signed and Sealed this

Twelfth Day of September, 2000

Attest:

Q. TODD DICKINSON

*Attesting Officer*    *Director of Patents and Trademarks*